United States Patent
Sasamura et al.

(10) Patent No.: US 9,115,254 B2
(45) Date of Patent: Aug. 25, 2015

(54) RESIN COMPOSITION, FOAMED RESIN USING SAME, AND ELECTRIC WIRE INSULATED WITH FOAMED RESIN

(75) Inventors: Tatsuya Sasamura, Hitachi (JP); Hideyuki Suzuki, Hitachi (JP); Akinari Nakayama, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 140 days.

(21) Appl. No.: 12/886,598

(22) Filed: Sep. 21, 2010

(65) Prior Publication Data

US 2011/0198106 A1     Aug. 18, 2011

(30) Foreign Application Priority Data

Feb. 12, 2010 (JP) ................. 2010-029298

(51) Int. Cl.
| H01B 3/30 | (2006.01) |
| C08J 9/00 | (2006.01) |
| B29C 44/04 | (2006.01) |
| B29C 44/34 | (2006.01) |
| C08L 23/06 | (2006.01) |

(52) U.S. Cl.
CPC ........... *C08J 9/0061* (2013.01); *B29C 44/0461* (2013.01); *B29C 44/3453* (2013.01); *C08L 23/06* (2013.01); *C08J 2201/03* (2013.01); *C08J 2203/06* (2013.01); *C08J 2207/06* (2013.01); *C08J 2323/06* (2013.01); *C08J 2423/00* (2013.01); *C08J 2467/00* (2013.01)
USPC ................. 174/110 SR; 174/110 F

(58) Field of Classification Search
USPC .......................... 174/110 R, 110 F
See application file for complete search history.

(56) References Cited

U.S. PATENT DOCUMENTS

| 4,039,743 | A | * | 8/1977 | Gommans ................. 174/114 R |
| 4,078,111 | A | * | 3/1978 | Yamaguchi et al. ........... 427/120 |
| 4,216,101 | A | * | 8/1980 | Davis .............................. 252/581 |
| 4,637,955 | A | * | 1/1987 | Glaister ......................... 428/379 |
| 5,460,886 | A | * | 10/1995 | Ueno et al. ..................... 428/383 |
| 2009/0012194 | A1 | | 1/2009 | Okuda et al. |

FOREIGN PATENT DOCUMENTS

| CN | 101370860 A | 2/2009 |
| JP | 63-254619 | 10/1988 |
| JP | 03-195746 | 8/1991 |
| JP | 11-213759 | 8/1999 |
| JP | WO2003/000792 | 1/2003 |
| JP | 2005-271504 | 10/2005 |
| JP | 2008-303247 | * 12/2008 |
| JP | 2009-132849 | 6/2009 |
| WO | WO 03/000792 A1 | 1/2003 |

OTHER PUBLICATIONS

Notice of Rejection of Appln. No. JP 2010-029298 dated Jul. 16, 2013 with partial English translation.
CN Office Action of Appln. No. 201010226858.1 dated Sep. 5, 2014 with partial English translation.

* cited by examiner

*Primary Examiner* — Chau Nguyen
(74) *Attorney, Agent, or Firm* — Crowell & Moring LLP

(57) ABSTRACT

There is provided a resin composition for a foamed resin by generating bubbles, the resin composition made of a blend of a base resin and a polymer material other than the base resin, the polymer material dispersed in the base resin, in which: the bubbles are generated at circumference of the dispersed polymer material by infusing a foaming gas into the resin composition at a predetermined processing temperature; and melting point or glass transition temperature of the polymer material is between melting point of the base resin and the processing temperature.

14 Claims, 1 Drawing Sheet

RESIN COMPOSITION, FOAMED RESIN USING SAME, AND ELECTRIC WIRE INSULATED WITH FOAMED RESIN

CLAIM OF PRIORITY

The present application claims priority from Japanese patent application serial no. 2010-029298 filed on Feb. 12, 2010, the content of which is hereby incorporated by reference into this application.

BACKGROUND OF THE INVENTION

1. Field of the Invention

The present invention relates to an insulated wire, especially to a resin composition for formed insulator, a foamed resin using the resin composition and an electric wire insulated with the foamed resin.

2. Description of the Related Art

With the recent progress of information and communication networks, data transmission cables used between apparatuses must cope with high speed and large capacity, and excellent transmission characteristics at high frequency are required. For realizing these requirements, an increasing number of data transmission cables adopt a method called "differential transmission" in which positive and negative voltages are applied to a two-core cable. This differential transmission method has a feature of high resistance against an extrinsic noise.

On the other hand, the method has a restriction of strictly controlling a signal transmission time difference (delay time difference: skew) between the two cores of the cable. This is to prevent communication errors that may occur in the receiving-side apparatus as the result of the occurrence of time difference between signals transmitted from a plurality of core wires.

Skew is a delay time difference between individual electric wires and significantly relates to a dielectric constant of the insulator of the electric wire. And a high-speed transmission cable requires an insulator having a low dielectric constant and thereby a high foaming degree. As the foaming degree of insulator is higher, the dielectric constant thereof becomes lower. Therefore, the foaming degree of the insulator is one of the most important factors.

To conduct differential transmission, the foaming degree of insulator must be uniform along the longitudinal direction thereof. In addition, to suppress fluctuation of the foaming degree, it is effective to make bubbles fine. As each of bubbles is smaller, the number of bubbles becomes larger in the constant foaming degree, thereby decreasing the fluctuation of foaming degree.

On the other hand, an insulator having a high foaming degree generally has a small amount of resin, causing problems in which mechanical strength is insufficient and deformation and buckling easily occur. In order to prevent these problems, there is a method to reinforce the foamed insulators by means of a cable jacket and the like, though, the optimal method to maintain stable performance of the foamed insulators is to make bubbles fine, thereby dispersing load and stress.

As explained above, an ideal cable for high-speed transmission adopting differential transmission is a cable which has a large number of fine and uniform bubbles and has no (least) fluctuation of the foaming degree throughout the entire length.

Generally, there are two foaming methods: One is a method that uses a chemical foaming agent (so called chemical foaming); and the other is a method in which gas is infused into molten resin in an extruder and foaming is executed due to a pressure difference between an inside and outside of a die of the extruder (so called physical foaming).

The chemical foaming method is advantageous since it is easy to obtain an insulator having a foaming degree that does not fluctuate much. However, there are problems in that it is difficult to achieve a high foaming degree and the dielectric constant of the insulator becomes large in relation to the degree of foaming because the dielectric constant of foaming agent residue is prone to become large. For this reason, foamed insulators manufactured by the physical foaming method are mostly used for the cables used for high-speed differential transmission.

In the physical foaming method, in order to maintain a certain degree of foaming while making the bubbles fine, a large number of bubbles need to be generated, and it is important to select a foam nucleating agent. Generally-used foam nucleating agents are inorganic particles, such as clay, silica and the like, high-melting point polymers, such as PTFE (polytetrafluoroethylene) powder and the like, and organic chemical foaming agents (azodicarbonamide (ADCA), 4,4'-oxybis(benzensulfonylhydrazide) (OBSH), and the like). Although optimal composition and shape of the foam nucleating agent differ according to the base resin and processing conditions, basically, it is well-known that the number of generated bubbles increases with becoming small the particles since the number of added particles significantly increases even though the amount of addition is the same.

However, a nucleating agent of fine particles easily agglomerates and it is very difficult to uniformly disperse the agent in the resin. That is, when fine particles are simply added to resin, agglomeration of the fine particles occurs, resulting in fluctuation of the foaming properties and, in the worst case, causing an adverse effect on the properties of the resin composition.

Also, there has been another problem with adding large amounts of nucleating agent. Essentially, a nucleating agent is a foreign substance, and because the dielectric constant of most foam nucleating agents currently being in practical use is larger than that of the matrix polymer, adding large amounts of nucleating agent adversely affects dielectric characteristics of resin composition, resulting in impairing the advantage of the foam.

In order to overcome the flocculation problem, JP-A 2005-271504 discloses a manufacturing method for a foamed resin article without using a nucleating agent. According to JP-A 2005-271504, a pre-molded resin article made of a resin (A) and a resin (B) that are non-compatible with each other and have mutually different solubility and diffusion coefficient of carbon dioxide and the mass ratio of 1/99 to 99/1 for (A)/(B), is impregnated with the carbon dioxide at temperatures below the melting points of the resins (A) and (B) and subsequently is foamed, thereby being provided a foamed resin article.

SUMMARY OF THE INVENTION

Under these circumstances, it is an objective of the present invention to address the above problems and to provide a resin composition, a foamed resin using the resin composition and an electric wire insulated with the foamed resin in which the foamed resin has acquired a high foaming degree and uniform fine bubbles.

(I) According to one aspect of the present invention, there is provided a resin composition for a foamed resin by generating bubbles, the resin composition made of a blend of a base resin and a polymer material other than the base resin, the polymer material dispersed in the base resin, in which: the bubbles are generated at circumference of the dispersed polymer material by infusing a foaming gas into the resin composition at a predetermined processing temperature; and melting point ($T_m$) of the polymer material is between melting point of the base resin and the processing temperature.

(II) According to another aspect of the present invention, there is provided a resin composition for a foamed resin by generating bubbles, the resin composition made of a blend of a base resin and a polymer material other than the base resin, the polymer material dispersed in the base resin, in which: the bubbles are generated at circumference of the dispersed polymer material by infusing a foaming gas into the resin composition at a predetermined processing temperature; and glass transition temperature ($T_g$) of the polymer material is between melting point of the base resin and the processing temperature.

In the above aspects (I) and (II) of the present invention, the following modifications and changes can be made.

(i) The content of the polymer material is within a range from 0.1 to 45 parts by mass with regard to 100 parts by mass of total amount of the base resin and the polymer material.

(ii) There is provided a foamed resin having fine bubbles uniformly dispersed therein, the foamed resin made of the above resin composition.

(iii) There is provided an electric comprising a metal conductor and an insulator formed on an outer periphery of the metal conductor, in which the insulator is made of the above foamed resin.

(iv) The foaming degree of the foamed resin of the above electric wire is within a range from 50 to 90%.

ADVANTAGES OF THE INVENTION

According to the present invention, by blending a base resin with a polymer material other than the base resin of which the melting point or the glass transition temperature is between the melting point of the base resin and the process temperature of a physical foaming method, it is possible to provide a resin composition and a foamed resin using the resin composition in which the foamed resin has acquired a high foaming degree and uniform fine bubbles. By doing so, it is possible to provide an electric wire insulated with the foamed resin that enables high-speed transmission.

DETAILED DESCRIPTION OF THE PREFERRED EMBODIMENTS

Figure 1:
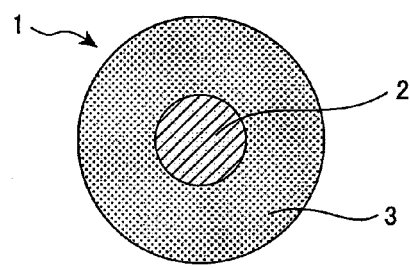
FIG. 1 is a schematic illustration showing a cross-sectional view of an exemplary electric wire insulated with a foamed resin according to the present invention.

In order to achieve the aforementioned objectives, the inventors of the present invention have studiously examined resin compositions and processing conditions (e.g., temperature etc.) to form uniformly fine bubbles in a foamed resin by means of a physical foaming method. Thus, the present invention has been accomplished.

Hereafter, a preferred embodiment of the present invention will be described in detail with reference to the attached drawings. However, the present invention is not limited to the embodiment described herein, and combinations and modifications can be made within the range in which the concept of the present invention is not altered.

(Resin Composition for Foamed Resin)

As described before, a resin composition for a foamed resin by generating bubbles according to the present invention has a feature as follows: The resin composition is made of a blend of a base resin and a polymer material other than the base resin; the polymer material is dispersed in the base resin; the bubbles are generated at circumference of the dispersed polymer material by infusing a foaming gas into the resin composition at a predetermined processing temperature; and melting point or glass transition temperature of the polymer material is between melting point of the base resin and the processing temperature.

It is preferable that the base resin of the present invention be a polyolefin resin or a fluoropolymer. A polyolefin resin can be as follows: polyethylene (PE), polypropylene (PP), ethylene-propylene copolymer, implant-type thermopolyolefin (TPO), ethylene-propylene-butene copolymer, ethylene-butene copolymer, ethylene-octen copolymer, ethylene-hexene copolymer, ethylene-pentene copolymer, and the like. More specifically, PEs include as follows: ultra high molecular weight polyethylene (UHMWPE), high density polyethylene (HDPE), middle density polyethylene (MDPE), low density polyethylene (LDPE), linear low density polyethylene (LLDPE), very low density polyethylene (VLDPE), and the like. PPs include as follows: block polypropylene (b-PP), random polypropylene (r-PP), atactic polypropylene (APP), syndiotactic polypropylene (SPP), isotactic polypropylene (IPP), and the like.

Especially, it is preferable that LDPE be solely used or a mixture of LDPE and HDPE be used as the base resin. This is because polyethylene has a small dielectric constant, which can reduce transmission loss in the cable, and polyethylene is inexpensive since it is a general-purpose polymer. The dielectric characteristics of HDPE include small tan δ, which is advantageous for reducing transmission loss in the cable. However, because of a linear-chain type in which the molecular structure does not have branches, melt viscosity is low and HDPE is not suitable for foam molding when used solely. On the other hand, LDPE has high melting viscosity because of the branched molecular structure, and when LDPE is blended with HDPE, the degree of foaming can be increased.

A fluoropolymer can be as follows: polytetrafluoro ethylene (PTFE), ethylene-tetrafluoro ethylene copolymer (ETFE), tetrafluoro ethylene-hexafluoro propene copolymer (TEP), tetrafluoro ethylene-perfluoroalkoxy ethylene copolymer (PFA), polychlorotrifluoro ethylene (PCTFE), ethylene-chlorotrifluoro ethylene copolymer (ECTFE), polyvinylidene difluoride (PVDF), polyvinyl fluoride (PVF), and the like. A single substance of those or a mixture of two or more of the above substances can be used.

The base resin can further include, as necessary: a colorant, antioxidant, viscosity regulator, reinforce, filler, plasticizer (softener), curing agent, curing accelerator, cross-linking agent, cross-linking auxiliary agent, foaming auxiliary agent, antioxidant, heat-resisting stabilizer, weather-resisting stabilizer, antistatic agent, lubricant, ultraviolet absorber, light stabilizer, flame-retarding agent, surfactant, compatibilizing agent, and other additives.

A flame-retarding agent can be as follows: metal hydroxide, phosphorus-system flame-retarding agent, silicon-system flame-retarding agent, nitrogen-system flame-retarding agent, boric acid compound, molybdenum compound, and the like. From an environmental protection point of view, metal hydroxide is preferred. Metal hydroxides include, e.g., magnesium hydroxide, aluminum hydroxide and calcium hydroxide, and magnesium hydroxide is most preferred because of a high flame-retarding effect thereof.

For example, when the base resin is polyolefin resin, any polymer can be selected as a polymer material other than the base resin from polybutylene, cellulose, cellulose acetate, cellulose butyric acetate, polylactic acid. Furthermore, other polymer materials can be used as long as the polymer material has a melting point or a glass transition temperature between a melting point of the base resin and a processing temperature of a physical foaming method. Herein, the processing temperature of physical foaming method is defined as a temperature of the resin composition in an extruder. The resin temperature can be measured by means of, e.g., a thermocouple inserted into a measurement hole provided on a neck portion of the extruder.

The content of the polymer material other than the base resin used for the present invention is from 0.1 to 45 parts by mass is preferred with regard to 100 parts by mass of the total amount of the base resin and the polymer material; 0.5 to 40 parts by mass is more preferred; and 1 to 25 parts by mass is most preferred.

If the amount of addition of the polymer material to the base resin is less than 0.1 parts by mass, the foaming characteristics of the foamed resin become poor, resulting in coarsening bubbles, decreasing the foaming degree, or increasing fluctuations. If the amount of addition of the polymer material is more than 45 parts by mass, the mechanical strength of the foamed resin decreases, being prone to cause deformation or buckling. If deformation or buckling occurs to the foamed insulator of electric wires, unfavorable situations occur in that impedance fluctuates, delay time increases, and transmission loss increases.

Next, a manufacturing method for a foamed resin according to the present invention will be described.

First, the base resin and the polymer material other than the base resin are blended together. Although there are various methods to blend resins, typical three methods are as follows: dry blend method, master batch method, and full compound method. However, the present invention is not limited to these three methods.

(1) Dry blend method is a method in which pellet or powder type resins are directly supplied into a molding machine (e.g., extruder);

(2) Master batch method is a method in that the polymer material other than the base resin is beforehand mixed with a part of the base resin, an elemental resin constituting the base resin or another polymer at high concentration so as to form a resin composition (master batch), and the master batch is added into the base resin excluding the polymer material in a molding machine (e.g., extruder); and (3) Full compound method is a method in that a resin composition is created by beforehand kneading the base resin and the polymer material by a facultative method (e.g., with a twin-screw extruder, or the like), and then the kneaded resin composition is put into a molding machine (e.g., extruder).

After that, a foaming gas is infused into molten resin in the extruder, and then foaming is executed due to a pressure difference between an inside and outside of a die of the extruder, thus being provided a foamed resin.

A mechanism of foaming the resin composition will be explained in detail.

In the resin composition for the foamed resin according to the present invention, gas molecules of the foaming gas infused into molten resin composition in the extruder are dissolved into both the base resin and polymer material. Herein, because the polymer material has a higher melting point or glass transition temperature than the base resin, the crystallization or vitrification of the polymer material occurs more anterior than the crystallization of the base resin during cooling. With crystallizing the polymer material, the foaming gas molecules dissolved in the polymer material are excluded from the crystallized polymer chain (crystallized region), and the gas molecule concentration increases in a still molten region of the resin composition.

On the other hand, in the resin composition, there are lots of interfaces between the base resin and the polymer material due to uniform dispersion of the polymer material by kneading the resin composition. The crystallization of polymer material is the most likely to occur at the interface. Therefore, the gas molecule concentration around the interface becomes remarkably high, which causes to generate a bubble nucleus by thermal fluctuation of the foaming gas.

As a result, a large number of fine bubbles are generated and grow uniformly. Thus, it is possible to produce an ideal foamed resin (insulator) having uniform fine bubbles, a high foaming degree and a low dielectric constant.

Next, an electric wire insulated with a foamed resin (a foamed resin insulated wire) according to the present invention will be described.

FIG. 1 is a schematic illustration showing a cross-sectional view of an exemplary electric wire insulated with a foamed resin according to the present invention. As shown in FIG. 1, an electric wire 1 comprises a conductor 2 and a foamed resin (foamed insulator) 3 extrusion-coated on an outer circumference of the conductor 2, the foamed resin 3 having a large number of fine bubbles.

The conductor 2 can be a single wire or a twisted wire, and besides a copper wire, aluminum wire, silver wire, and a variety of alloy wires. In some cases, a tube-type conductor can be used. Furthermore, it is possible to plate the surface with aluminum, silver, tin, or other arbitrary substances. For example, it is possible to use a copper coated aluminum conductor in which the surface of an aluminum conductor is coated with copper.

The foamed insulator 3 can be a single layer or a combination of plural foamed layers. A skin layer can be additionally provided in the inner periphery portion and/or the outer periphery portion of the foamed insulator 3, the skin layer being not foamed layer or foamed layer having extremely low foaming degree in comparison with the foamed insulator 3.

It is preferable that the foaming degree of the foamed insulator 3 be 50% or more and 90% or less. If the foaming degree of the foamed insulator 3 is less than 50%, the dielectric constant of the foamed insulator 3 is prone to increase. If the foaming degree of the foamed insulator 3 is more than 90%, the mechanical strength of the foamed insulator 3 is prone to decrease and the insulator easily deforms.

As described before, the foamed insulator (foamed resin) 3 according to the present invention has uniform fine bubbles, a high foaming degree and a low dielectric constant. Therefore, the electric wire 1 insulated with the foamed resin according to the invention has a low skew, and is suitable for a high-speed transmission cable.

Figure 2:
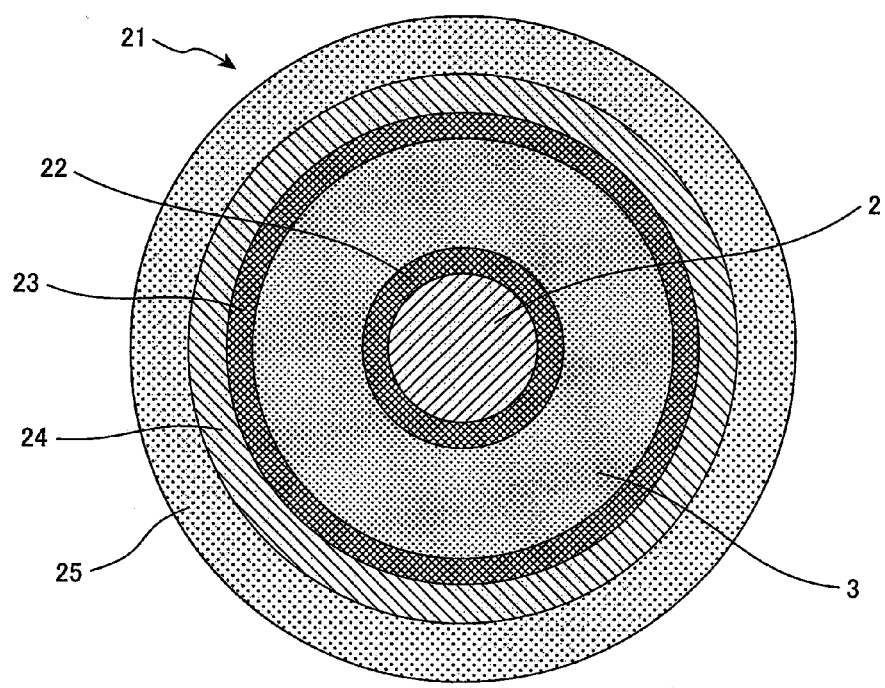
FIG. 2 is a schematic illustration showing a cross-sectional view of a co-axial cable insulated with a foamed resin according to the present invention.

FIG. 2 is a schematic illustration showing a cross-sectional view of a co-axial cable insulated with a foamed resin according to the present invention. As shown in FIG. 2, a co-axial cable 21 is constructed such that: an internal skin layer 22 is formed right on top of the conductor (internal conductor) 2; an external skin layer 23 is formed in the outer periphery portion of the foamed insulator 3, the skin layers 22, 23 being not foamed layer or foamed layer having extremely low foaming degree in comparison with the foamed insulator 3; an external conductor 24 is formed on the outer periphery of the external skin layer 23; and then a sheath 25 is formed on the outer periphery of the external conductor 24.

According to the purpose of use and required performance, the external conductor 24 can be arbitrarily created such that: an extra-fine metal wire is transversely wound or braided; or fine metal particles are applied and baked; or a metal foil or metal sheet is wound. The internal skin layer 22 or external skin layer 23 can be omitted.

Furthermore, arbitrary material, such as polyolefin (e.g., polyethylene, polypropylene, and the like), fluoropolymer, and polyvinyl chloride, can be used for the material of the sheath 25. The sheath 25 can further include, as necessary: a colorant, antioxidant, viscosity regulator, reinforce, filler, plasticizer (softener), curing agent, curing accelerator, cross-linking agent, cross-linking auxiliary agent, antioxidant, heat-resisting stabilizer, weather-resisting stabilizer, anti-static agent, lubricant, ultraviolet absorber, light stabilizer, flame-retarding agent, surfactant, compatibilizing agent, and other additives.

The co-axial cable 21 according to the invention has a low skew as well as the electric wire 1 shown in FIG. 1 because of using the foamed insulator 3 made of the foamed resin of the invention, and is also suitable for a high-speed transmission cable.

In this specification, although the electric wire 1 and co-axial cable 21 are described as an exemplary wire or cable according to the present invention, the invention is not limited to them. The configuration of the electric wire or cable of the invention can be arbitrarily chosen.

EXAMPLES

Next, the present invention will be described by referring Examples 1 to 8 and Comparative Examples 1 to 8. By providing conditions shown in Table 1, there was fabricated a 10,000-meter wire insulated with a foamed resin having a structure shown in FIG. 1 whose target outer diameter and target foaming degree were 1.45 mm and 60%, respectively.

TABLE 1

| Item | Condition |
|---|---|
| Resin blending method | Dry blend method |
| Type of extruder | Gas injection foaming extruder |
| Extruder screw diameter D | 45 mm |
| Extruder screw length L | 1300 mm |
| L/D | 29 |
| Extrusion temperature | 160 to 180° C. |
| Infused gas | $N_2$ |
| Gas pressure | 36 to 38 MPa |
| Conductor diameter | AWG 24 (0.51 mm) |
| Type of conductor | Copper wire |
| Extrusion rate | 150 to 180 m/min |
| Target outer diameter | 1.45 mm |
| Target foaming degree | 60% |

As shown in Table 1, a gas injection foaming extruder was used to form the foamed resin insulated wires of the Examples and Comparative Examples. The gas injection foaming extruder had a screw diameter D of 45 mm, a screw length L of 1300 mm and an L/D ratio of 29.

The method for determining the average bubble diameter of the foamed resin that covers each conductor is described below. Each foamed resin insulated wire was transversely cut at five different positions which were spaced a sufficiently large distance (1000 m or more) apart from one another. And, each cross section was displayed on a scanning electron microscope (SEM, SN-3000 available from Hitachi High-Technologies Corporation) and photographed.

Then, the equivalent diameter of each bubble at each cross section was determined as follows by using image-analyzing software (WinROOF available from Mitani Corporation). First, the information on the scale bar on the SEM photograph was inputted into the software to determine the size of the pixel of the software. Then, the perimeter of each bubble displayed on the software was manually traced to obtain the area of the bubble. And, the equivalent diameter of the bubble was calculated based on an equivalent circle having the area of the bubble.

Next, the average equivalent bubble diameter at each cross section was calculated by averaging the equivalent diameters of all the bubbles contained in the cross section. Finally, the average equivalent bubble diameter of the foamed resin covering each conductor was determined by averaging the average equivalent bubble diameters at all five cross sections. Foamed resins having an average equivalent bubble diameter of 100 μm or smaller were determined to pass and marked with "Passed" in Tables, and foamed resins not satisfying the above criteria were determined to fail and marked with "Failed" in Tables.

Each foamed resin insulated wire was measured for the fluctuation of the foaming degree during extrusion across a length of 10,000 m. Specifically, during the extrusion of each foamed resin insulated wire, outer diameter (b) and capacitance (C) of the wire were monitored in-line at an interval of 1 second, and the changes over time were measured. Then, specific dielectric constant at each moment was calculated from conductor diameter (a) and the monitored values of b and C. Furthermore, a foaming degree at each moment was calculated according to the formula of A. S. Windeler. Thus, the fluctuation of the foaming degree of the foamed resin during extrusion was calculated. The fluctuation of the foaming degree of each foamed resin during extrusion was defined as the larger one of the difference between the maximum value and the average value and the difference between the minimum value and the average value.

Herein, the effective specific dielectric constant $\in_{eff}$ of the foamed insulator at each moment was obtained by the following equation 1. $\in_0$ is the dielectric constant of vacuum.

$$\varepsilon_{eff} = \frac{C \cdot \ln(b/a)}{2\pi \cdot \varepsilon_0} \qquad \text{Eq. 1}$$

The foaming degree at each moment was obtained by the following equation 2 according to the formula of A. S. Windeler. In Eq. 2, $\in_i$ is a specific dielectric constant of insulator material and the specific dielectric constant of air $\in_a$ is 1.

$$\text{Foaming Degree} = \frac{2\varepsilon_{eff} + \varepsilon_a}{3\varepsilon_{eff}} \times \frac{\varepsilon_i - \varepsilon_{eff}}{\varepsilon_i - \varepsilon_a} \qquad \text{Eq. 2}$$

As described above, Examples and Comparative Examples were all fabricated to have an average foaming degree of 60%. Therefore, only the foaming degree fluctuations are shown in Tables. Foamed resins whose foaming degree fluctuated between 59.0% and 61.0% (i.e., having a foaming degree fluctuation of 1.0% or less) were determined to pass and marked with "Passed" in Tables, and foam resins not satisfying this criteria were determined to fail and marked with "Failed" in Tables.

Table 2 shows specifications and measurement evaluation results of Examples 1 to 8; and Table 3 shows specifications and measurement evaluation results of Comparative examples 1 to 8.

TABLE 2

| | | Polymer | Tm | Example 1 | Example 2 | Example 3 | Example 4 |
|---|---|---|---|---|---|---|---|
| Base resin | HDPE | DGDA-6944 *1 | Tm = 130° C. | 99.9 pbm | 99 pbm | 80 pbm | 55 pbm |
| | LDPE | DFDA-1253 *1 | Tm = 110° C. | | | | |
| Polymer material other than base resin | Polybutylene | Beaulon *2 | Tm = 127° C. | 0.1 pbm | 1 pbm | 20 pbm | 45 pbm |
| | Polylactic acid | Lacea TP-4000 *2 | Tm = 170° C. | | | | |
| | | Extrusion temperature (° C.) | | 180 | 180 | 180 | 180 |
| | | Average diameter of bubbles (μm) | | 60 | 40 | 50 | 70 |
| | | (Evaluation) | | Passed | Passed | Passed | Passed |
| | | Fluctuation of foaming degree during extrusion (%) | | 0.6 | 0.5 | 0.5 | 0.6 |
| | | (Evaluation) | | Passed | Passed | Passed | Passed |

| | | Polymer | Tm | Example 5 | Example 6 | Example 7 | Example 8 |
|---|---|---|---|---|---|---|---|
| Base resin | HDPE | DGDA-6944 *1 | Tm = 130° C. | 50.0 pbm | 50 pbm | 40 pbm | 28 pbm |
| | LDPE | DFDA-1253 *1 | Tm = 110° C. | 49.9 pbm | 49 pbm | 40 pbm | 27 pbm |
| Polymer material other than base resin | Polybutylene | Beaulon *2 | Tm = 127° C. | | | | |
| | Polylactic acid | Lacea TP-4000 *2 | Tm = 170° C. | 0.1 pbm | 1 pbm | 20 pbm | 45 pbm |
| | | Extrusion temperature (° C.) | | 180 | 180 | 180 | 180 |
| | | Average diameter of bubbles (μm) | | 70 | 50 | 50 | 80 |
| | | (Evaluation) | | Passed | Passed | Passed | Passed |
| | | Fluctuation of foaming degree during extrusion (%) | | 0.6 | 0.5 | 0.5 | 0.7 |
| | | (Evaluation) | | Passed | Passed | Passed | Passed |

*1 The Dow Chemical Company;
*2 Mitsui Chemicals, Inc.;
Tm: melting point; and
pbm: parts by mass.

TABLE 3

| | | Polymer | Tm | Comparative Example 1 | Comparative Example 2 | Comparative Example 3 | Comparative Example 4 |
|---|---|---|---|---|---|---|---|
| Base resin | HDPE | DGDA-6944 *1 | Tm = 130° C. | 99.9 pbm | 99 pbm | 80 pbm | 55 pbm |
| | LDPE | DFDA-1253 *1 | Tm = 110° C. | | | | |
| Polymer material other than base resin | Polybutylene | Beaulon *2 | Tm = 127° C. | 0.1 pbm | 1 pbm | 20 pbm | 45 pbm |
| | Polylactic acid | Lacea TP-4000 *2 | Tm = 170° C. | | | | |
| | | Extrusion temperature (° C.) | | 180 | 180 | 180 | 180 |
| | | Average diameter of bubbles (μm) | | 110 | 90 | 100 | 120 |
| | | (Evaluation) | | Failed | Passed | Passed | Failed |
| | | Fluctuation of foaming degree during extrusion (%) | | 1.3 | 1.1 | 1.3 | 1.8 |
| | | (Evaluation) | | Failed | Failed | Failed | Failed |

| | | Polymer | Tm | Comparative Example 5 | Comparative Example 6 | Comparative Example 7 | Comparative Example 8 |
|---|---|---|---|---|---|---|---|
| Base resin | HDPE | DGDA-6944 *1 | Tm = 130° C. | 50.0 pbm | 50 pbm | 40 pbm | 28 pbm |
| | LDPE | DFDA-1253 *1 | Tm = 110° C. | 49.9 pbm | 49 pbm | 40 pbm | 27 pbm |
| Polymer material | Polybutylene | Beaulon *2 | Tm = 127° C. | | | | |

TABLE 3-continued

| other than base resin | Poly-lactic acid | Lacea TP-4000 *2 | Tm = 170° C. | 0.1 pbm | 1 pbm | 20 pbm | 45 pbm |
|---|---|---|---|---|---|---|---|
| | | Extrusion temperature (° C.) | | 160 | 160 | 160 | 160 |
| | | Average diameter of bubbles (μm) | | 110 | 80 | Impossible to be extruded | |
| | | (Evaluation) | | Failed | Passed | | |
| | | Fluctuation of foaming degree during extrusion (%) | | 1.3 | 1.1 | | |
| | | (Evaluation) | | Failed | Failed | | |

*1 The Dow Chemical Company;
*2 Mitsui Chemicals, Inc.;
Tm: melting point; and
pbm: parts by mass.

Example 1 (whose base resin has a melting point lower than the polymer material dispersed in the base resin) outperforms Comparative Example 1 (whose base resin has a melting point higher than the polymer material) in terms of both bubble diameter and foaming degree fluctuation. A probable reason for this result is as follows: During the extrusion for fabricating Example 1, the polymer material dispersed in the base resin first crystallized before the base resin crystallized. As a result, the foaming gas molecules dissolved in the polymer material was expelled out of the crystallized regions of the polymer material into the boundary regions between the polymer material and the base resin, thereby increasing the foaming gas molecule concentration at such boundaries and then generating bubbles of the foaming gas. In contrast, in Comparative Example 1, the above-described phenomenon did not occur because the base resin and the polymer material approximately simultaneously crystallized (exactly to say, the base resin crystallized slightly before the polymer material did), thus generating bubbles of the foaming gas at random.

Similarly to the above result, Example 2 outperforms Comparative Example 2 (in both of which the concentration of the polymer material dispersed in the base resin was 1 pbm); Example 3 outperforms Comparative Example 3 (in both of which the polymer material concentration was 20 pbm); and Example 4 outperforms Comparative Example 4 (in both of which the polymer material concentration was 45 pbm).

Example 5 (in which the resin composition was extruded at a higher temperature than the melting point of the polymer material dispersed in the base resin) outperforms Comparative Example 5 (in which the extrusion temperature (processing temperature) was lower than the melting point of the polymer material) in terms of both bubble diameter and foaming degree fluctuation. A probable reason for this result is as follows: During the extrusion for fabricating Example 5, the foaming gas molecule was dissolved in the polymer material dispersed in the base resin, generating bubbles of the foaming gas. In contrast, in Comparative Example 5, the foaming gas molecule was not dissolved in the polymer material but was dissolved only in the base resin, thus generating bubbles of the foaming gas in the base resin at random as well as at the interface between the base resin and the polymer material.

Similarly to this result, Example 6 outperforms Comparative Example 6 (in both of which the polymer material concentration was 1 pbm). Example 7 (in which the polymer material concentration was 20 pbm) and Example 8 (in which the polymer material concentration was 45 pbm) were successfully fabricated and showed good measurement evaluations. On the contrary, Comparative Examples 7 and 8 could not be fabricated (extruded) because a large amount (20 pbm or more) of the polymer material in not-molten state (i.e., solid state) existed in the molten base resin.

From the above results, the following conclusion can be drawn: The resin composition according to the present invention is prepared by dispersing a polymer material other than a base resin in the base resin by kneading. By making novel use of the certain property differences between the polymer material and the base resin, bubbles of a foaming gas can be efficiently generated at the boundary regions between the polymer material and the base resin. Hence, by using the resin composition of the invention, foamed resins (foamed insulators) having a high foaming degree and fine bubbles can be easily formed at a low cost. Thus, a high-speed transmission cable can be manufactured by forming a foamed insulator from the resin composition according to the invention.

Although the present invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A foamed resin made of a resin composition having fine bubbles uniformly dispersed therein, wherein
the resin composition comprises a blend of a polyolefin base resin and a polymer material other than the polyolefin base resin, the polymer material being dispersed in the polyolefin base resin;
the bubbles are generated at boundary regions between the base resin and the dispersed polymer material by infusing a foaming gas into the resin composition at a predetermined processing temperature;
the melting point or glass transition temperature of the polymer material is greater than the melting point of the polyolefin base resin and less than the processing temperature; and
the foamed resin is produced by a process comprising blending the polyolefin base resin and the polymer material to provide the resin composition, kneading the resin composition, providing the resin composition in a molding machine, heating the resin composition in the molding machine to provide a molten resin composition, infusing a foaming gas into the molten resin composition in the molding machine at the predetermined processing temperature, molding the resin composition, and foaming the resin composition due to a pressure difference between an inside and outside of the molding machine by generating bubbles at boundary regions between the polyolefin base resin and the dispersed polymer material due to a difference between the melt- ing point or glass transition temperature of the polymer material and the melting point of the polyolefin base resin.

2. The resin composition according to claim 1, wherein:
content of the polymer material is within a range from 0.1 to 45 parts by mass with regard to 100 parts by mass of total amount of the polvolefin base resin and the polymer material.

3. An electric wire, comprising a metal conductor and an insulator formed on an outer periphery of the metal conductor, wherein the insulator is made of the foamed resin according to claim 1.

4. The electric wire according to claim 3, wherein foaming degree of the foamed resin is within a range from 50 to 90%.

5. The electric wire according to claim 3, wherein the insulator made of the foamed resin has a foaming degree fluctuation of 1.0% or less.

6. The resin composition according to claim 1, wherein:
the polyolefin base resin comprises at least one member selected from the group consisting of polyethylene, polypropylene, ethylene-propylene copolymer, implant-type thermopolyolefin, ethylene-propylene-butene copolymer, ethylene-butene copolymer, ethylene-octen copolymer, ethylene-hexene copolymer, and ethylene-pentene copolymer.

7. The resin composition according to claim 1, wherein:
content of the polymer material is within a range from 1 to 25 parts by mass with regard to 100 parts by mass of total amount of the polyolefin base resin and the polymer material.

8. A foamed resin made of a resin composition having fine bubbles uniformly dispersed therein, wherein
the resin composition comprises a blend of a base resin and a polymer material other than the base resin, the polymer material being dispersed in the base resin;
the bubbles are generated at boundary regions between the base resin and the dispersed polymer material by infusing a foaming gas into the resin composition at a predetermined processing temperature;
the melting point or glass transition temperature of the polymer material is greater than the melting point of the base resin and less than about 180° C; and
the foamed resin is produced by a process comprising blending the base resin and the polymer material to provide the resin composition, kneading the resin composition, providing the resin composition in a molding machine, heating the resin composition in the molding machine to provide a molten resin composition, infusing a foaming gas into the molten resin composition in the molding machine at the predetermined processing temperature, the predetermined processing temperature being about 180° C. or less, molding the resin composition, and foaming the resin composition due to a pressure difference between an inside and outside of the molding machine by generating bubbles at boundary regions between the base resin and the dispersed polymer material due to a difference between the melting point or glass transition temperature of the polymer material and the melting point of the base resin.

9. The resin composition according to claim 8, wherein:
content of the polymer material is within a range from 0.1 to 45 parts by mass with regard to 100 parts by mass of total amount of the base resin and the polymer material. A foamed resin made of the resin composition according to claim 1, having fines bubbles uniformly dispersed therein.

10. An electric wire, comprising a metal conductor and an insulator formed on an outer periphery of the metal conductor, wherein the insulator is made of the foamed resin according to claim 8.

11. The electric wire according to claim 10, wherein foaming degree of the foamed resin is within a range from 50 to 90%.

12. The electric wire according to claim 10, wherein the insulator made of the foamed resin has a foaming degree fluctuation of 1.0% or less.

13. The resin composition according to claim 8, wherein:
the base resin comprises at least one polyolefin selected from the group consisting of polyethylene, polypropylene, ethylene-propylene copolymer, implant-type thermopolyolefin, ethylene-propylene-butene copolymer, ethylene-butene copolymer, ethylene-octen copolymer, ethylene-hexene copolymer, and ethylene-pentene copolymer.

14. The resin composition according to claim 8, wherein:
content of the polymer material is within a range from 1 to 25 parts by mass with regard to 100 parts by mass of total amount of the base resin and the polymer material.

* * * * *